(12) United States Patent
Shiraishi

(10) Patent No.: US 12,177,393 B2
(45) Date of Patent: Dec. 24, 2024

(54) DOCUMENT PROCESSING SYSTEM AND CONTROL METHOD THEREOF

(71) Applicant: CANON KABUSHIKI KAISHA, Tokyo (JP)

(72) Inventor: Kenichi Shiraishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/297,445

(22) Filed: Apr. 7, 2023

(65) Prior Publication Data

US 2023/0336673 A1  Oct. 19, 2023

(30) Foreign Application Priority Data

Apr. 14, 2022 (JP) .................................. 2022-066655

(51) Int. Cl.
*G06F 15/00* (2006.01)
*H04N 1/00* (2006.01)

(52) U.S. Cl.
CPC ..... *H04N 1/00477* (2013.01); *H04N 1/00209* (2013.01); *H04N 1/00244* (2013.01); *H04N 1/00408* (2013.01); *H04N 2201/0072* (2013.01)

(58) Field of Classification Search
None
See application file for complete search history.

(56) References Cited

U.S. PATENT DOCUMENTS

| | | | |
|---|---|---|---|
| 2012/0019873 A1* | 1/2012 | Tian | H04N 1/33346 358/442 |
| 2012/0050795 A1* | 3/2012 | Nakamura | G06F 3/1287 358/1.15 |
| 2015/0106665 A1* | 4/2015 | Choh | H04L 51/08 714/57 |
| 2019/0310809 A1* | 10/2019 | Sekine | G06F 3/1235 |

FOREIGN PATENT DOCUMENTS

JP         2017045099 A     3/2017

* cited by examiner

*Primary Examiner* — Mark R Milia
(74) *Attorney, Agent, or Firm* — Canon U.S.A., Inc. IP Division

(57) ABSTRACT

A document processing system configured to communicate with a server includes at least one memory that stores instructions, and at least one processor that executes the instructions to receive a scanned document from an image processing apparatus, transmit the received scanned document and a processing request for processing the scanned document to the server, manage a processing status regarding processing of the received scanned document, and issue a notification to a user in a case where a predetermined processing time regarding the processing of the scanned document passes based on the managed processing status.

10 Claims, 13 Drawing Sheets

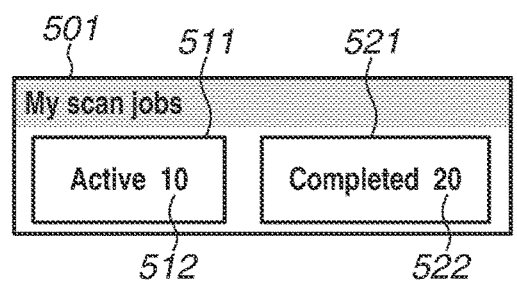

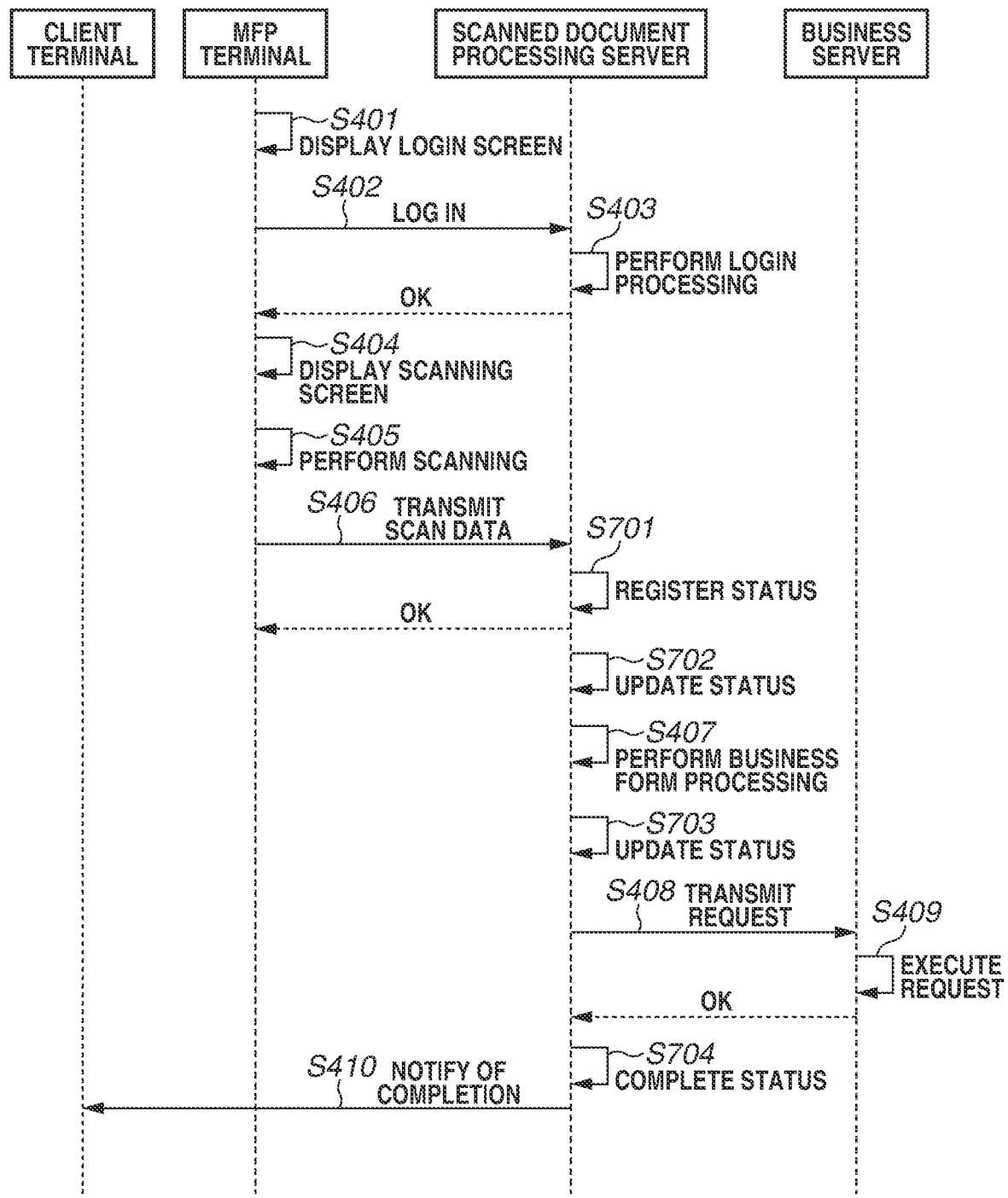

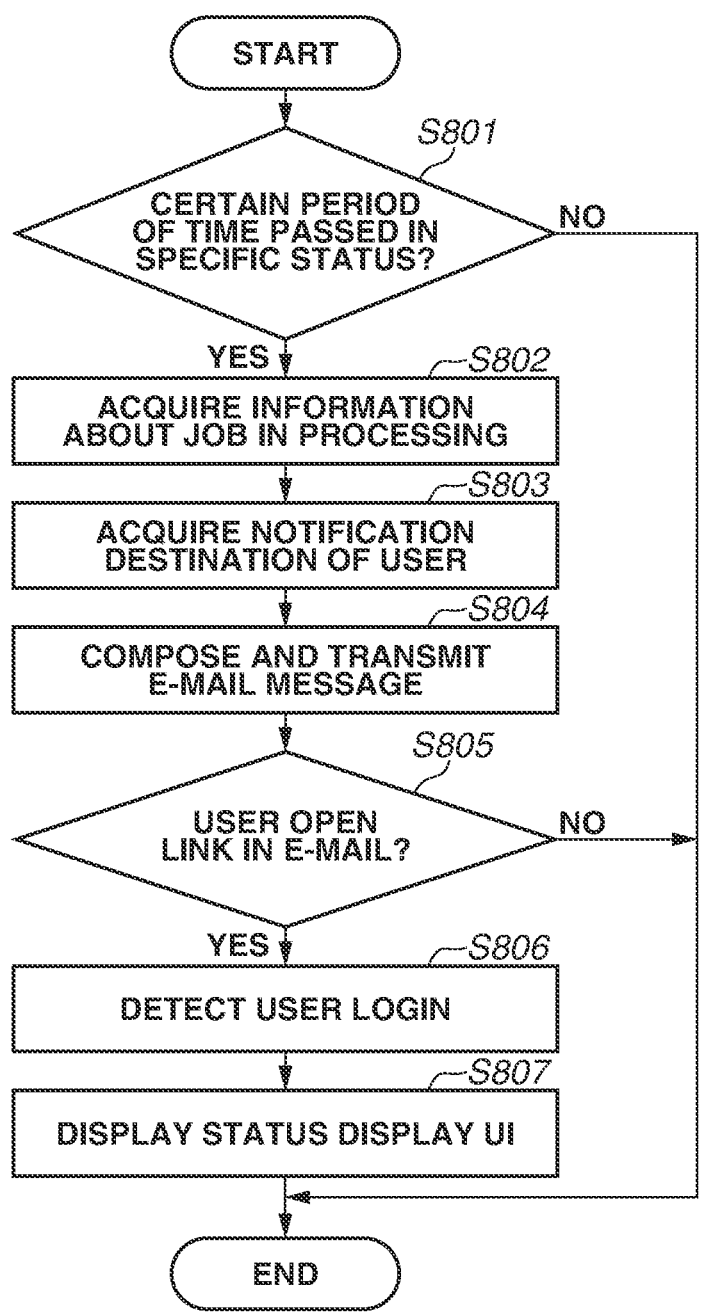

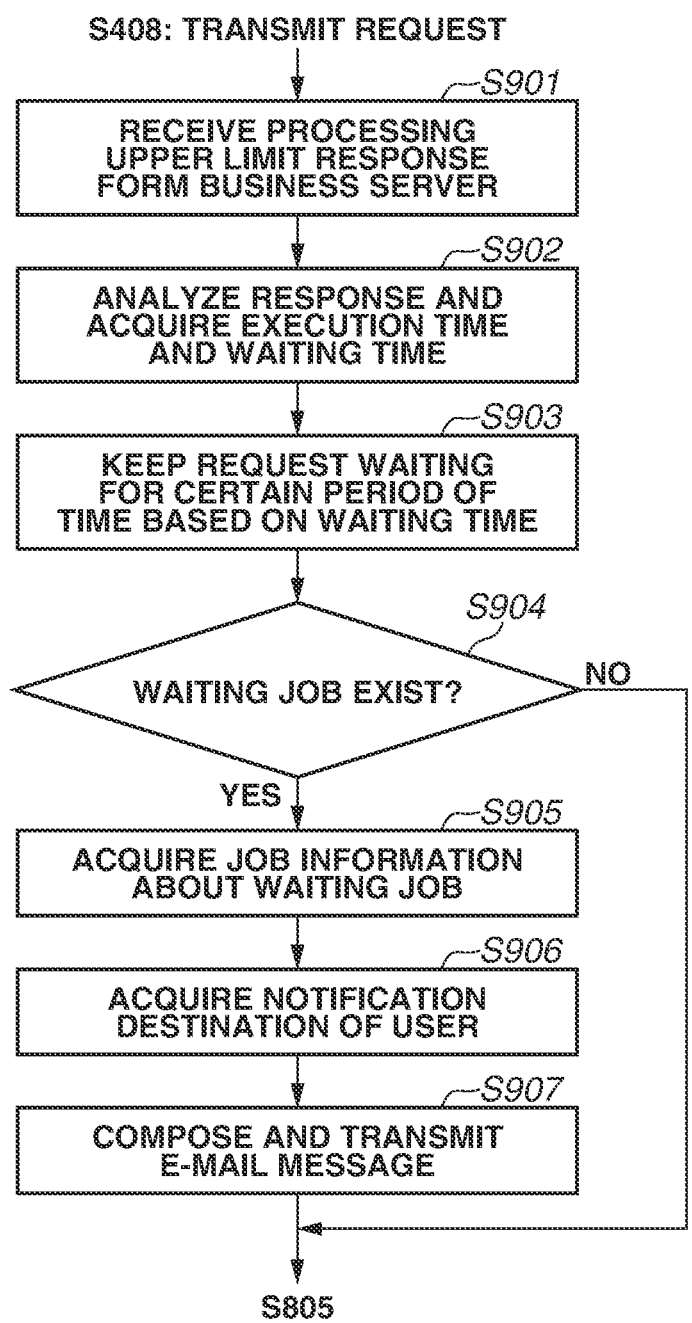

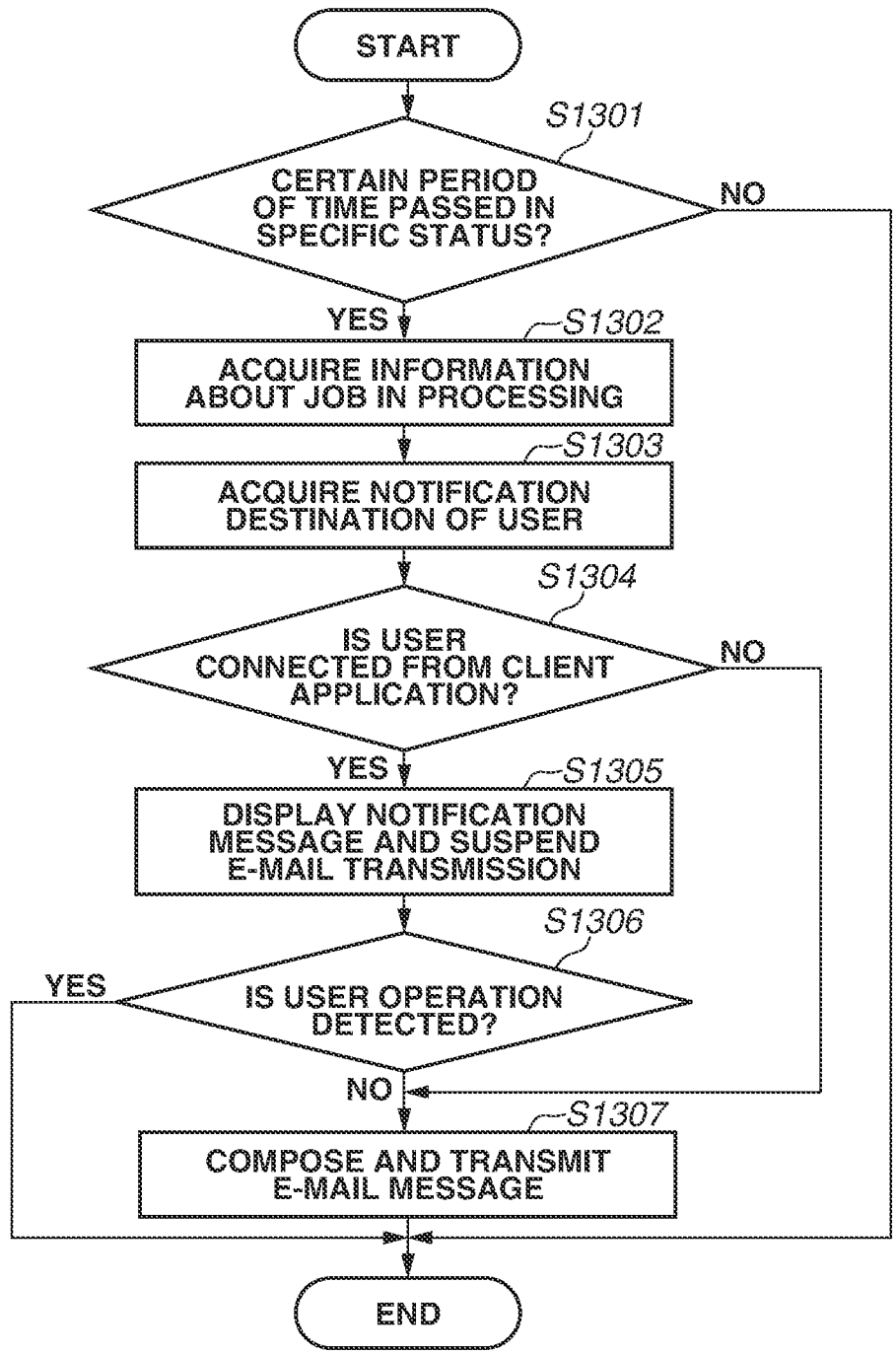

DOCUMENT PROCESSING SYSTEM AND CONTROL METHOD THEREOF

BACKGROUND

Field

The present disclosure relates to a document processing system that notifies a user of a processing status of a scanned document and a control method.

Description of the Related Art

Conventionally, there is a document management system that scans a paper document using a multifunction peripheral (MFP) terminal, digitizes it, and performs business form processing, such as setting metadata such as a file name and storing the document, on the digitized document. An example of using a cloud service such as a cloud storage as a document storage destination is widely known.

In a configuration in which the MFP terminal, the document management system, and the cloud storage cooperate with each other, the document management system uses an application programming interface (API) published by the cloud service to perform processing on a folder and a file stored in the cloud storage.

On the other hand, in a case where a number of requests exceeding an upper limit are made to the cloud service, restrictions such as a decrease in processing speed and suspension of processing are imposed.

Japanese Patent Application Laid-Open No. 2017-045099 discusses a technique for notifying a user of a next operation to be performed in a case where an API request fails.

However, the technique according to Japanese Patent Application Laid-Open No. 2017-045099 relates to a recovery method after failure in request processing and does not consider processing to be performed in a case where request processing speed decreases.

SUMMARY

According to an aspect of the present disclosure, a document processing system configured to communicate with a server includes at least one memory that stores instructions, and at least one processor that executes the instructions to receive a scanned document from an image processing apparatus, transmit the received scanned document and a processing request for processing the scanned document to the server, manage a processing status regarding processing of the received scanned document, and issue a notification to a user in a case where a predetermined processing time regarding the processing of the scanned document passes based on the managed processing status.

Further features of the present disclosure will become apparent from the following description of exemplary embodiments with reference to the attached drawings.

BRIEF DESCRIPTION OF THE DRAWINGS

FIGS. 5A, 5B-1, and 5B-2 illustrate processing status display user interfaces (UI) displayed by a client application.

FIG. 7 is a processing sequence diagram among devices.

FIG. 8 is a flowchart illustrating a method for issuing a notification to a user.

FIG. 9 is a flowchart illustrating a method for issuing a notification to a user.

FIG. 13 is a flowchart illustrating a method for issuing a notification to a user.

DESCRIPTION OF THE EMBODIMENTS

Exemplary embodiments according to the present disclosure will be described with reference to the attached drawings.

Figure 1:
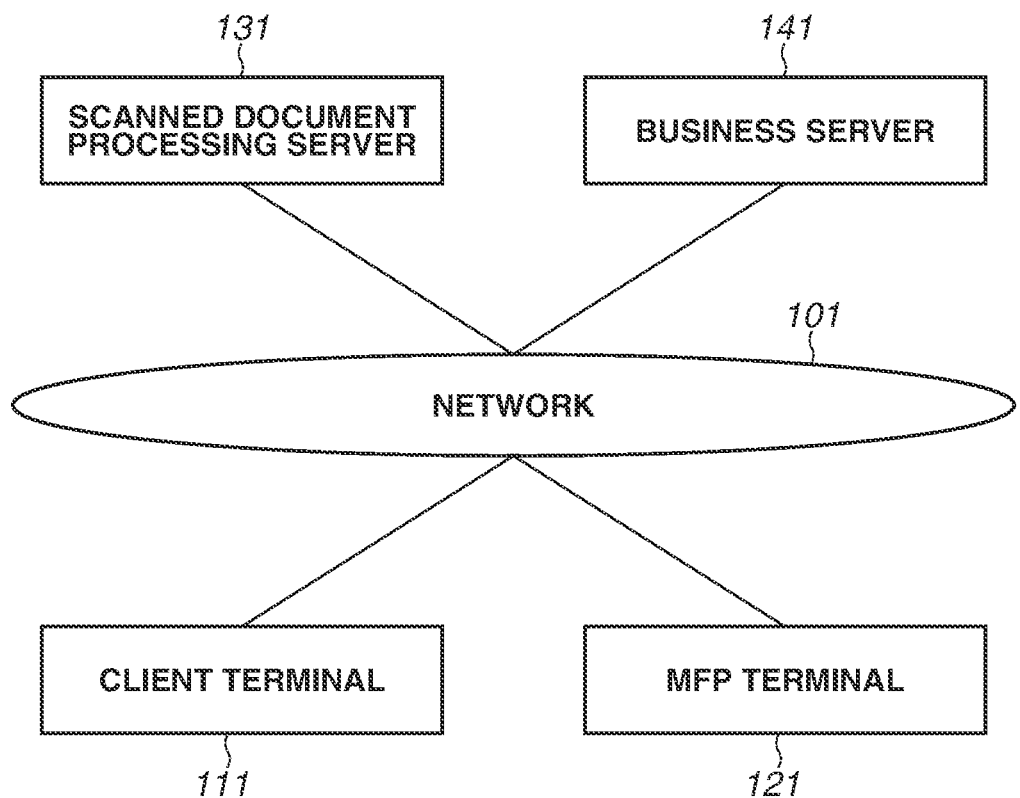
FIG. 1 illustrates a system configuration and a network configuration.

FIG. 1 illustrates an example of a system configuration and a network configuration.

A network 101 includes an Internet and an intranet. A client terminal 111 includes various forms and types such as a personal computer, a laptop computer, a tablet computer, and a smartphone. A multifunction peripheral (MFP) terminal 121 is an image processing apparatus such as a multifunction peripheral having a plurality of functions such as a scanner and a printer. A scanned document processing server 131 functions as a document processing system and is an example of a service having functions of storing an image file scanned by the MFP terminal 121 in its own server, transferring the image file to a service that can store a file such as a cloud service, and the like. A business server 141 is assumed to be a service such as a cloud storage that has functions of managing a file and a document, and the like, but may be other arbitrary business applications. The business server 141 may be replaced with a mail server or the like, and a scanned image may be attached to an e-mail and transmitted.

Figure 2:
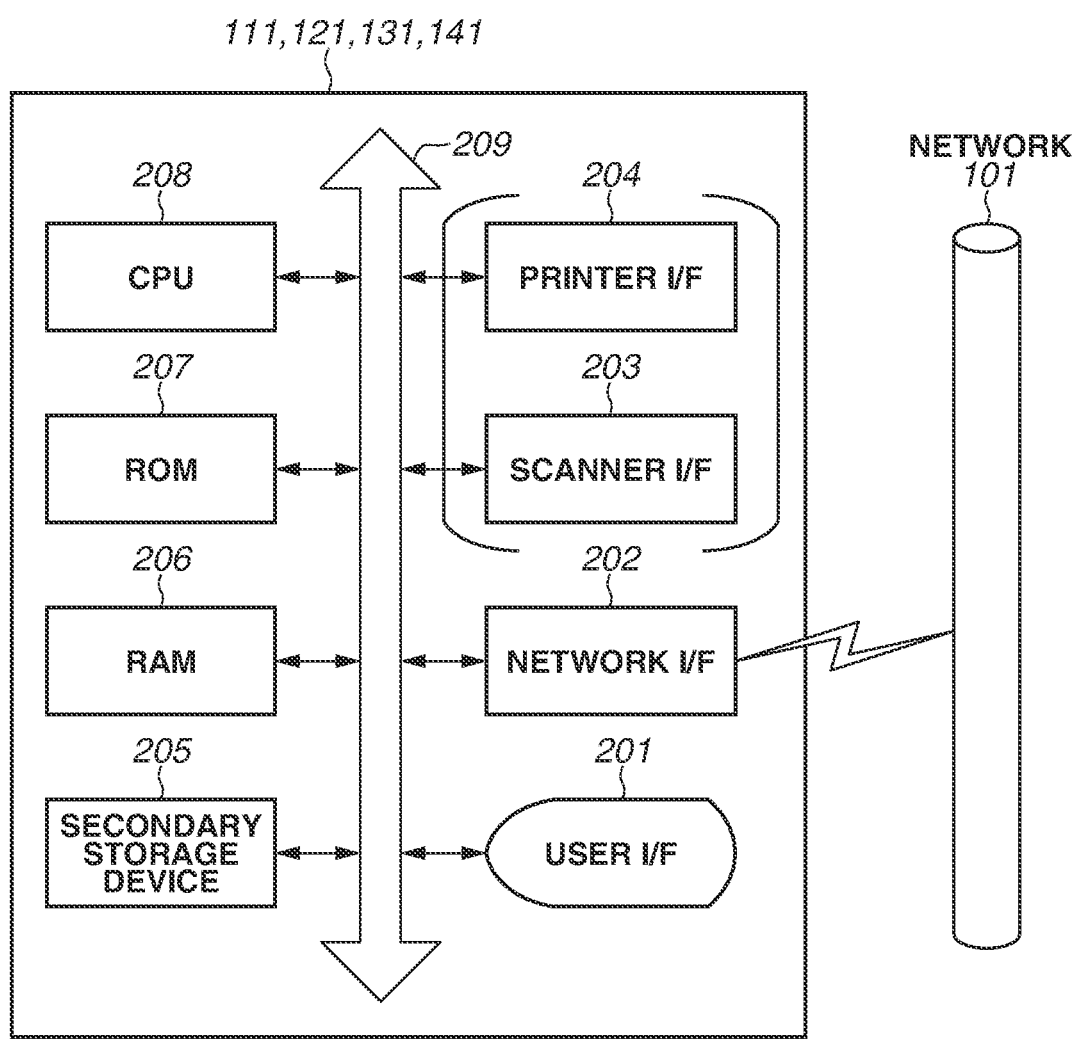
FIG. 2 is an information processing function hardware configuration diagram.

FIG. 2 illustrates an example of a module configuration of functions of the client terminal 111, the MFP terminal 121, and an information processing apparatus. The information processing apparatus according to the present exemplary embodiment refers to a server computer on which virtual machines functioning as the scanned document processing server 131 and the business server 141 operate.

A user interface 201 is an interface used to control an input from and an output to an external device such as a display, a keyboard, a mouse, a button, and a touch panel. A computer that does not include the above-described hardware can be connected and operated from another computer using a remote desktop or a remote shell. A network interface 202 connects to a network such as a local area network (LAN) and communicates with another computer, an MFP, a printer, a network device, and an external service. A communication method may be wired or wireless. A printer interface 204 and a scanner interface 203 are device configurations that exist in the MFP terminal 121, and are interfaces that are used to control an input from and an output to a printer unit and a scanner unit, respectively. Each of the scanned document processing server 131, the business server 141, and the client terminal 111 may not include the printer interface 204 and the scanner interface 203. A secondary storage device 205 is represented by a hard disk drive (HDD) and a flash memory. A random access memory (RAM) 206 is a temporary memory area. A read-only memory (ROM) 207 stores an embedded program and data. A central processing unit (CPU) 208 executes a program read from the secondary storage device 205, the RAM 206, the ROM 207, or the like. Each processing unit is configured to exchange data with each other via a system bus 209.

Figure 3:
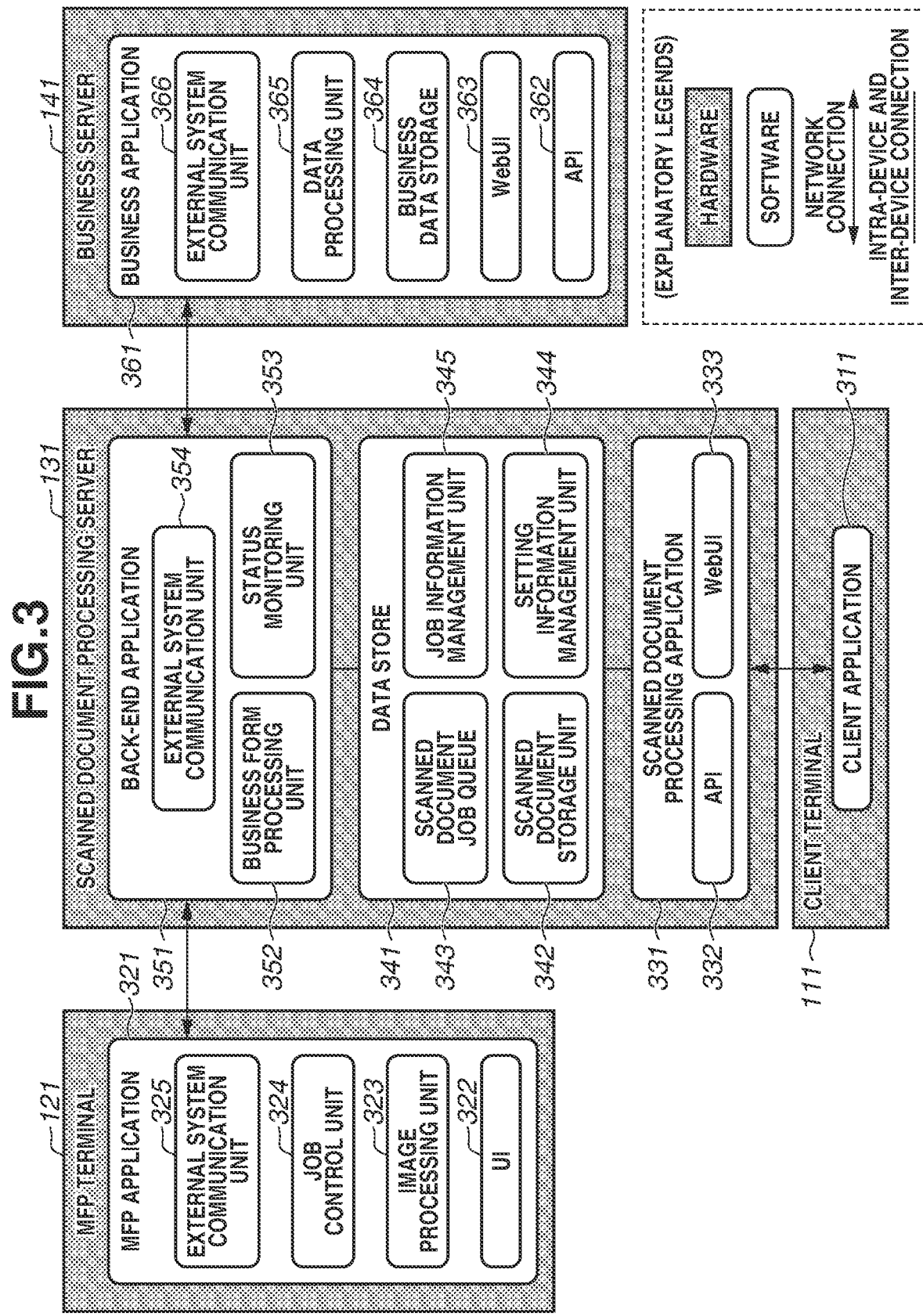
FIG. 3 illustrates a software configuration and a hardware configuration of the present system.

FIG. 3 illustrates a software configuration of the present system. Software installed in each hardware is executed by the CPU 208, and is configured to be able to communicate with each other as indicated by arrows in a network connection.

According to the present exemplary embodiment, a client application 311 executes a web application of a scanned document processing application 331 to be described below. As one form for providing the client application 311, there is a method for displaying a web user interface (UI) 333 on a browser, transmitting and receiving necessary data to and from an application programming interface (API) 332, and executing a web application.

Alternatively, the client application 311 may be a device application of a computer or smartphone generated to transmit and receive the necessary data to and from the API 332.

An MFP application 321 is executed by the MFP terminal 121, and an example of the MFP application 321 is a scan application that transmits a scanned document to the scanned document processing server 131.

A UI 322 is provided by the scan application and presents editing of a setting to be applied to the scanned document, execution of scanning, display of an image of the scanned document, and the like.

An image processing unit 323 generates an image such as an image file in a Joint Photographic Experts Group (JPEG) format or a document file in a Portable Document Format (PDF) from data obtained by scanning a document using the scanner connected to the scanner I/F 203.

A job control unit 324 manages an execution job to be issued based on a setting specified by the UI 322 and the image obtained by scanning a document.

An external system communication unit 325 is a communication processing unit that transmits a document processing request and analyzes a response to the request using an approval request for connecting to the scanned document processing server 131, the scanned document obtained by formatting necessary data from a scan job, applied setting information, and the like as parameters.

The scanned document processing application 331 is installed on the scanned document processing server 131. According to the present exemplary embodiment, the scanned document processing application 331 is described as operating as a web application server, but other application implementations may be used.

The API 332 is provided by the scanned document processing application 331.

The web UI 333 is provided by the scanned document processing application 331.

A data store 341 saves and stores data used by the scanned document processing application 331 or a back-end application 351, which is to be described below. The data store 341 stores various data to be described below.

A scanned document storage unit 342 stores a file of the scanned document itself as a JPEG image file, a PDF document file, or the like.

A scanned document job queue 343 stores a queue for managing a job waiting to be processed, which is to be described below. In order to simplify the description, a single queue is to be described, but a plurality of queues may be provided according to a priority of a schedule or a processing content.

A setting information management unit 344 manages setting information to be used in scanning and account information necessary for cooperation with the scanned document processing server 131 and the business server 141 in association with a user. The setting information management unit 344 also manages other settings of the entire scanned document processing server 131

A job information management unit 345 manages detailed information about a job such as a processing status, a registration date, and applied setting information for each job.

The back-end application 351 executes background processing. The back-end application 351 is responsible for the processing to be described below.

A business form processing unit 352 controls a job in the data store 341 and performs business form processing on the scanned document. Examples of the business form processing includes acquisition of an input image from the scanned document storage unit 342, optical character recognition (OCR), division, conversion, as well as business form discrimination processing represented by pattern recognition and machine learning, and text data extraction processing.

A status monitoring unit 353 checks a processing status and a load status of a job according to the present disclosure to be described below or the scanned document processing server 131 and the business server 141, and executes processing corresponding to each status.

An external system communication unit 354 executes processing related to transmission and reception such as receiving job data transmitted from the MFP terminal 121, transmitting a request for approval or data processing to the external business server 141, and analyzing a response result to the request.

A business application 361 is executed by the business server 141.

An API 362 is provided by the business application 361.

A web UI 363 is provided by the business application 361.

A business data storage 364 stores data to be used by the business application 361.

A data processing unit 365 uses information about a file and a folder stored in the business data storage 364 and executes an operation request specified by a user via the scanned document processing server 131 and the client application 311.

An external system communication unit 366 executes processing related to transmission and reception such as analyzing a request received from the scanned document processing server 131 and transmitting a processing result as a response.

In order to simplify the description, forms and configurations of the client terminal 111, the MFP terminal 121, and the business server 141 are each integrated into one application. However, they may be provided in the forms and configurations in which systems and applications are separated based on their roles in the same manner as the back-end application 351, the data store 341, and the scanned document processing application 331 in the scanned document processing server 131.

One or more business servers 141 cooperating with the scanned document processing server 131 are required for the purpose of transmitting, processing, and storing a processing result of the scanned document processing server 131. A form and a configuration in which only one business server 141 is provided may be adopted in such a manner that the web UI 333 is displayed on the MFP application 321, and an image is uploaded from the client application 311 and analyzed by the business form processing unit 352.

Figure 4:
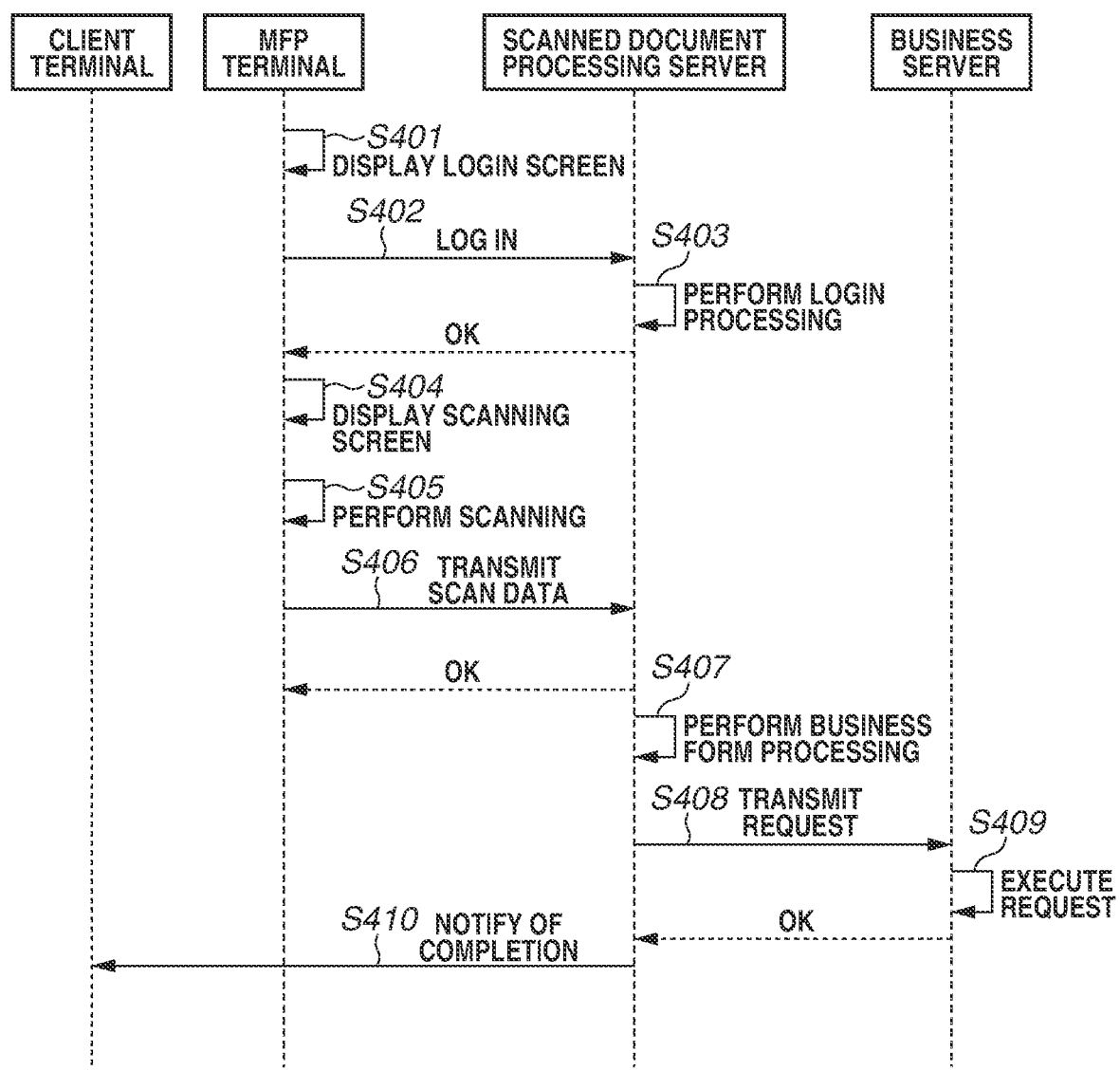
FIG. 4 is a basic diagram illustrating processing sequences among devices.

FIG. 4 is a sequence diagram among devices illustrating a series of basic operations from transmitting a scanned document to storing the scanned document in the business server.

In step S401, the MFP terminal 121 executes the MFP application 321, presents necessary operations to a user (also referred to as an operating user) on the UI 322, and starts processing.

The user inputs information (identification (ID), a password, and a specific keyword) to log into the scanned document processing server 131 on the UI 322. An arbitrary login method can be used, such as storing the login information in advance in the MFP terminal 121, or associating the login information about the MFP terminal 121 itself with the login information about the scanned document processing server 131.

In step S402, the MFP application 321 transmits a login request to the back-end application 351 of the scanned document processing server 131 from the external system communication unit 325 based on the input contents.

In step S403, the back-end application 351 of the scanned document processing server 131 analyzes the received request and returns a response result to the MFP application 321.

In step S404, after successfully connecting to the scanned document processing server 131, the MFP application 321 displays a scanning operation screen to the user on the UI 322.

In step S405, the user specifies a setting for the scanned document and a setting necessary for subsequent processing, such as a transmission destination, and executes scanning. Scan data acquired by the image processing unit 323, the settings specified by the operating user, and information about the operating user himself/herself are jobs to be executed by the job control unit 324.

In step S406, the MFP application 321 transmits job information from the external system communication unit 325 to the back-end application 351.

The MFP application 321 confirms reception of a transmission success response, and terminates the operation.

In step S407, the scanned document processing server 131 registers the job information uploaded from the MFP terminal 121 in the scanned document storage unit 342, the job information management unit 345, and the scanned document job queue 343 using the business form processing unit 352, and sequentially performs the business form processing. The business form processing is specifically the processing of OCR, division, and conversion.

In step S408, upon completing the business form processing, the scanned document processing server 131 generates a request in the external system communication unit 354 and transmits the request to the business server 141.

In step S409, the business server 141 analyzes the received request and executes the processing requested by the scanned document processing server 131 in the data processing unit 365.

In step S410, upon completing the request processing, the business server 141 returns a response to the scanned document processing server 131, and the scanned document processing server 131 notifies the operating user of the completion result.

Regarding the notification, a method for displaying a web UI provided by a notification service, such an external mail and chat, using a browser to perform confirmation may be used as with the client application 311 in the client terminal 111. Alternatively, there is a method for performing confirmation using a device application for a computer or a smartphone provided by the notification service.

By the above-described operation, the user can store the document scanned by himself/herself in the business server 141.

In this case, however, the notification is not transmitted to the user until all processing is completed.

In a case where the API is used, it is common for the API to have a request upper limit, and in a case where the request upper limit is exceeded, there is a case where a restriction is imposed in such a manner that the request is kept waiting until processing is accepted, or is changed to a slower processing. In this case, the processing takes longer time than usual, and as a result, the user performs useless checking and waiting work such as repeatedly checking for an undelivered notification e-mail and the transmission destination, and waiting until receiving a completion notification although the user does not know when the completion notification will be delivered.

According to the present exemplary embodiment, when a certain period of time passes after a start of processing of a user's job or at a timing when it is determined that the processing will take a long time based on a processing status of the cloud, the user is notified of a current processing status, and the current processing status is presented to the user. Accordingly, the user can check the job status and eliminate useless checking and waiting work.

FIGS. 5A, 5B-1, and 5B-2 illustrate UIs for displaying a processing status presented to the user on the client application 311 according to the present disclosure.

A UI 501 displays an overview of user's job progress status and completion status together with the number of jobs registered in the respective statuses. The UI 501 includes an active job 511 and a completed job 521. A job on which processing has been started is registered in the active job 511 and is moved from the active job 511 to the completed job 521 when processing is completed. In a case where the processing status changes, the display is updated. As update means, arbitrary means may be used, such as manual update using a button or the like or automatic update in response to a change in the processing status.

The UI 501 includes the numbers of jobs 512 and 522 registered in the respective jobs.

In a case where the active job 511 or the completed job 521 is selected, a UI 531 or a UI 551, which displays details of the respective registered jobs, is displayed.

These UIs are assumed to be added as a widget on a page that manages user and job information, such as a dashboard of a document management system provided by the scanned document processing application 331. However, an arbitrary form may be used as a display to a user, such as providing a single web page.

The UIs 531 and 551 respectively include registered jobs 541 and 561, and information 542 to 545 about the active jobs 541, and information 562 to 564 about the completed jobs 561 are displayed to the user. In order to simplify the description, only the necessary information is described, but arbitrary information related to the job may be added or deleted and presented.

The information 542 indicates an identifier for identifying the job. The identifier is assumed to be a file name set by the user at the time of scanning, but other information that can identify the job registered by the user, such as a job ID or a device name, can also be used.

The information 543 is a progress bar that indicates a current progress status, and the information 544 is a text version of the progress status. The process from the start to the completion of processing is divided into several steps, and a status name is set for each step, so that it is possible to visualize the processing status of the user's job.

In the present description, as an example, the status until transmission from the MFP terminal 121 to the scanned document processing server 131 is referred to as "Receiving", and the status until the business form processing in the scanned document processing server 131 is completed is referred to as "Processing". The status from the completion of the business form processing to the completion of transmission execution to the business server 141 is referred to as "Sending". In a configuration that provides a UI for editing a job to the client application 311 and confirms a setting before transmission, "UserActionRequired" is included as one of the steps. Examples of these statuses may be further subdivided or integrated into the processing status and defined in arbitrary processing step.

The UIs that display the details are also updated in a case where the processing status changes. As update means, arbitrary means may be used, such as manual update using a button or the like or automatic update in response to a change in the processing status.

Figure 6A:
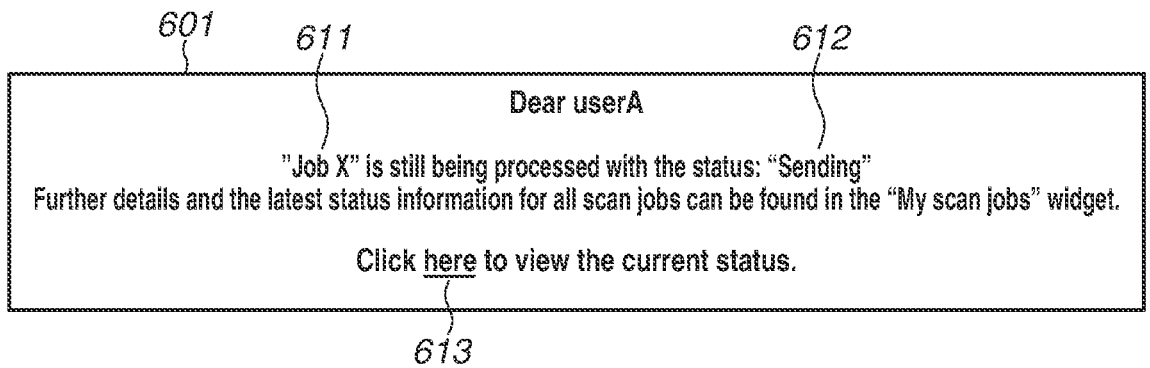
FIGS. 6A and 6B illustrate notification contents to be notified to a user.
Figure 6B:
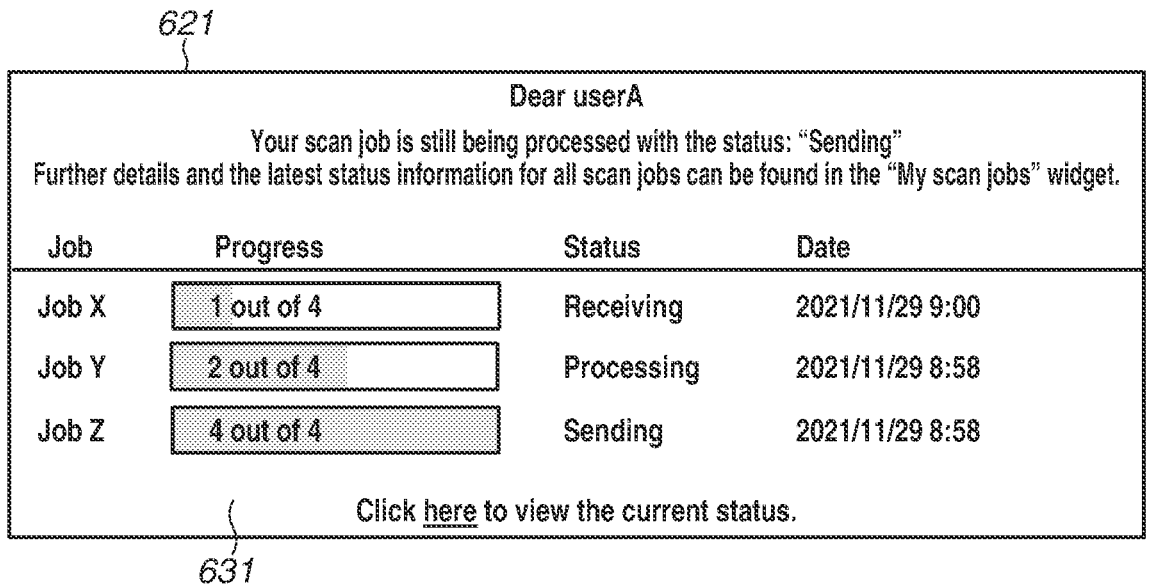

FIGS. 6A and 6B are examples of basic forms according to the present disclosure, illustrating contents to be notified in a case where the certain period of time passes after processing of the user's job is started. An e-mail service is assumed as a notification, and two examples 601 and 621 of e-mail texts are presented, but as described above, it may be provided in other configurations and forms. As long as the content can be presented to the user that the job is being processed, any other text may be used.

An identifier 611 is used for identifying the user's job, and the identifier indicated as the information 542 in FIG. 5B-1 is displayed.

A status 612 displays the status of the job indicated as the information 544 in FIG. 5B-1.

A Uniform Resource Locator (URL) link 613 is used to guide a user to a web page that displays the status as illustrated in FIG. 5A on the client application 311.

The example 601 is the basic form, but, for example, the example 621 is also given in which a status display 631 immediately before this notification is transmitted is indicated in a mail body so that the user can confirm it without changing the page, and the page can be shifted if detailed information is required.

FIG. 7 is a processing sequence diagram among devices according to the present disclosure. Only the operations different from the sequence diagram among devices in FIG. 4, which describes the series of processing flows from transmission of the scanned document to storage in the business server 141 are additionally described.

In order to simplify the description, the statuses of a job in processing are to be described using the above-described three statuses of "Receiving", "Processing", and "Sending" as examples.

Immediately after the MFP application 321 completes the scan processing in step S405 and executes the request to upload the data in step S406, in step S701, added status registration processing is executed. In a case where upload of the job to the scanned document processing server 131 is started, the business form processing unit 352 registers the job status in the job information management unit 345, and the status monitoring unit 353 starts monitoring each job. At this time, the status of the job to be uploaded is registered as "Receiving" according to the present exemplary embodiment.

In a case where upload of all jobs is completed, in step S702, the business form processing unit 352 changes the status of the uploaded jobs from "Receiving" to "Processing". The status changed here is the status registered in the job information management unit 345.

In a case where the business form processing in step S407 is completed for each job, in step S703, the business form processing unit 352 changes the status to the next status "Sending".

Finally, in step S704, in a case where the transmission request to the business server 141 is completed, the business form processing unit 352 changes the status registered in the job information management unit 345 from the active job to the completed job. Further, the status monitoring unit 353 stops the monitoring processing that has been started corresponding to the completed job.

FIG. 8 illustrates processing performed by the status monitoring unit 353 according to the present disclosure. A flowchart illustrates a series of processing from monitoring the status to notifying the user of the status in a case where a predetermined processing time of predetermined processing passes.

In step S801, the status monitoring unit 353 determines whether a predefined period of time passes using the start of registration or status update of each job as trigger.

As the predefined period of time, a fixed time is assumed regardless of each status, but different time setting may be provided for each processing, or a single time may be set from the start of processing without separating the status. Setting of the predefined period of time may be defined on the system side, or may be defined by a user by providing a setting screen on the client application 311.

In a case where the status monitoring unit 353 detects that the predefined period of time passes without the job status being updated (YES in step S801), in step S802, the status monitoring unit 353 acquires detailed information such as the status and a job name of the corresponding job from the job information management unit 345.

In step S803, the status monitoring unit 353 acquires information about a notification destination such as an e-mail address from the account information about the user registered in the setting information management unit 344 based on the operating user information defined in the job information management unit 345.

In step S804, the status monitoring unit 353 composes an e-mail message described in FIGS. 6A and 6B and transmits the e-mail to the user based on the information acquired in steps S802 and S803.

User operations are to be described. In step S805, in a case where the user opens the link in the transmitted e-mail (YES in step S805), the client application 311 presents a login screen to the user. In step S806, in a case where the user inputs the login information such as the ID, the password, and the specific keyword, the client application 311 performs verification and detects user login.

A form and a configuration may be adopted in which a token is issued by associating a URL of the link with each job or user in an e-mail notification to the user to reduce an input process in the login.

In step S807, a list of jobs associated with the user is acquired from the job information management unit 345 based on the user information detected in the login, and the respective statuses of the active job and the completed job are displayed as illustrated in FIGS. 5A, 5B-1, and 5B-2.

So far, methods of notification and display to the user in a case where the certain period of time passes from the start of processing of the user's job are described.

As described above, in the configuration using the API, the request upper limit of the API is commonly set. An example of issuing a notification to a user at a timing when the request upper limit is reached is described with reference to a flowchart in FIG. 9. Operations of the status monitoring unit 353 after the request transmission in step S408 at which the request upper limit is reached are to be described. Since the operation to open the e-mail is the same as that in step S805 and subsequent steps, the description thereof is omitted.

In step S901, in a case where a processing upper limit is reached after transmitting the request, a response in a case where the processing upper limit is reached is received from the business application 361 of the business server 141.

In step S902, the external system communication unit 354 of the scanned document processing server 131 analyzes the response and acquires information about a time required for execution and a waiting time necessary for the next request.

In step S903, the business form processing unit 352 interrupts a transmission request and waits for the waiting time acquired in step S902.

In step S904, the business form processing unit 352 checks whether there is a waiting job of the user. In a case where there is a waiting job (YES in step S904), in step S905, the business form processing unit 352 acquires information about the waiting job from the job information management unit 345.

In step S906, the status monitoring unit 353 acquires the information about the notification destination such as the e-mail address from the account information of the user registered in the setting information management unit 344 based on the operating user information defined in the job information management unit 345.

In step S907, the status monitoring unit 353 composes the e-mail message described in FIGS. 6A and 6B and transmits the e-mail to the user based on the information acquired in steps S905 and S906. In a case where there is no waiting job (NO in step S904), the processing is terminated.

At this time, the waiting time acquired in step S902 may be presented to the user as information to be written in the e-mail text, so that the user can confirm when the job will be resumed.

It is also possible to notify the user of the processing status at the timing when the processing upper limit is reached.

In the notification in the case where the processing upper limit is reached, there are examples in which the processing upper limit has already been reached before executing transmission, such as a case where the upper limit has been reached by a user's previous operation, and a case where the upper limit has been reached due to the use by another user within the upper limit set by an organization.

In these cases, the user is notified in advance that the upper limit has been reached before he or she completes the operation on the device, and thus can reduce useless checking work and waiting time after the operation on the device.

Figure 10A:
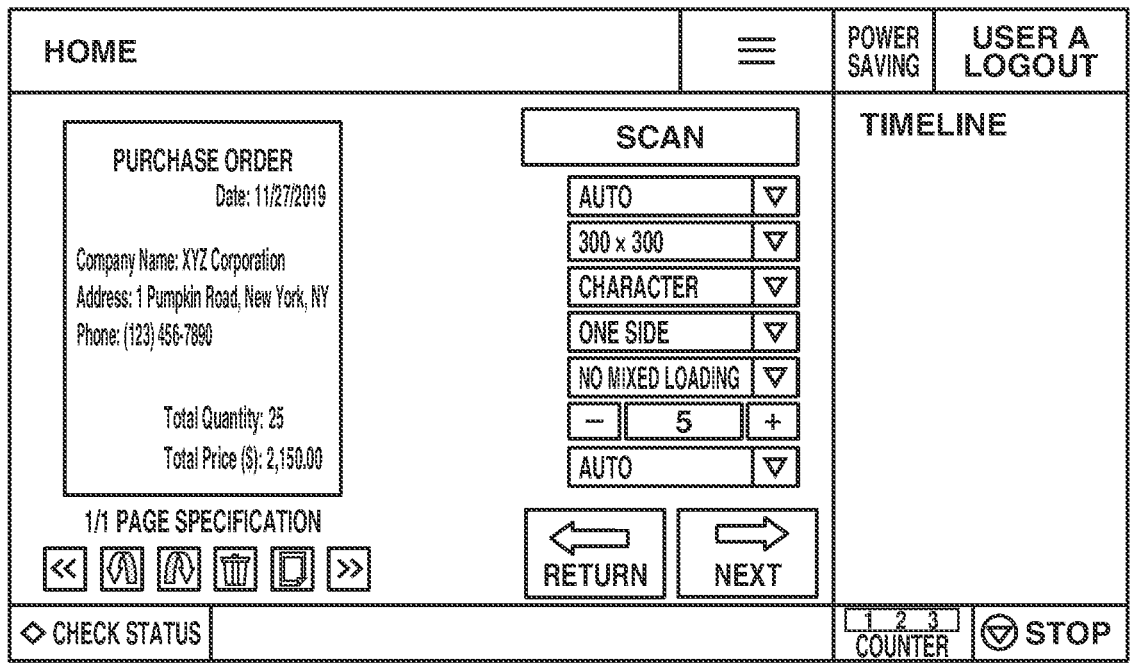
FIGS. 10A and 10B illustrate notification UIs to be displayed on a device.
Figure 10B:
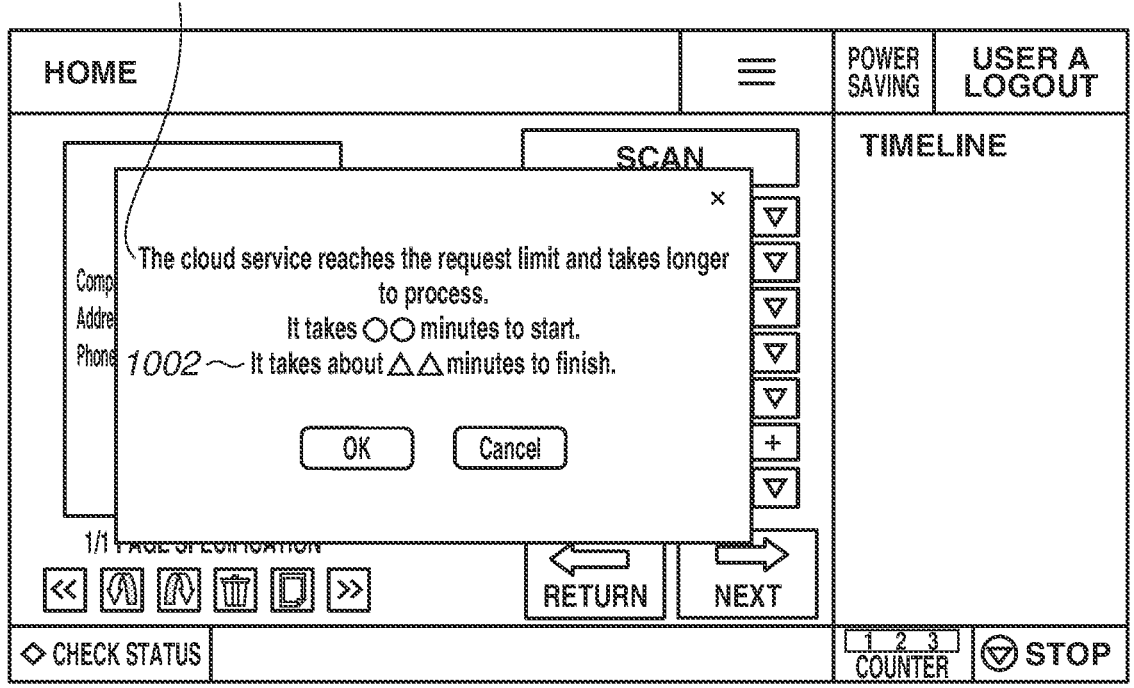

FIGS. 10A and 10B illustrate examples of screens displayed on the MFP terminal 121. FIG. 10A illustrates the screen during a user operation. FIG. 10B illustrates the screen in a case where there is a notification during the operation on the device in FIG. 10A.

A notification example 1001 is displayed on the UI 322 of the MFP application 321.

It is assumed that a dialog or the like is displayed, but arbitrary means may be used as long as it can notify the user that processing will take a long time.

A text 1002 is an example in which a start time and an estimated processing completion time, if it can be acquired, are described by the above-described processing. In addition, in a case where it is possible to notify the user that the processing takes a long time, for example, the number of waiting job requests in the scanned document processing server 131 may be displayed.

Figure 11:
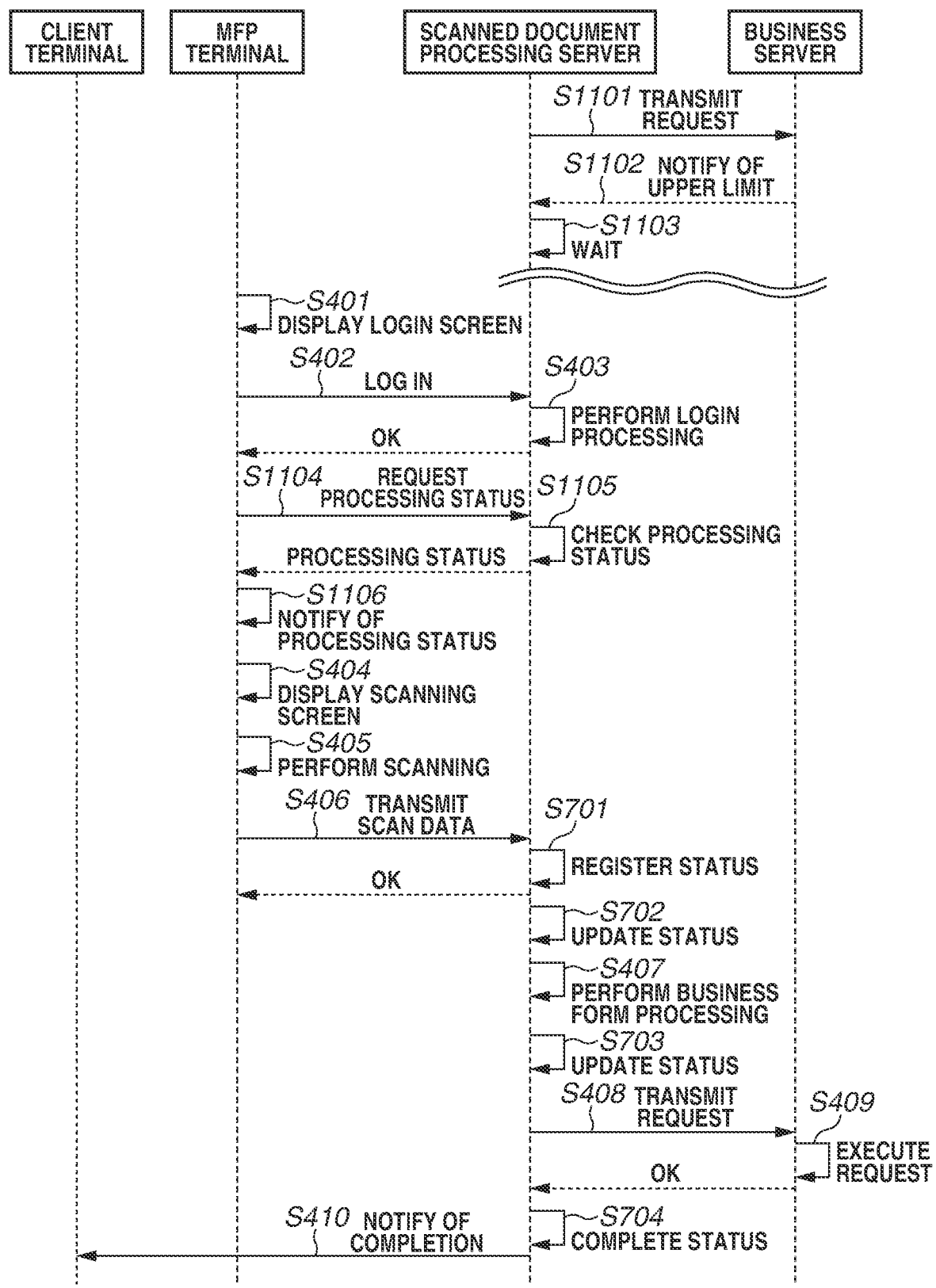
FIG. 11 is a processing sequence diagram among devices.

FIG. 11 illustrates an example of issuing a notification using the device in a case where the processing upper limit is reached during a user operation using the simplest processing sequence. Only the operations different from the sequence diagram among devices in FIG. 7, which describes the series of processing flows from transmission of the scanned document to storage in the business server 141, are additionally to be described.

It is assumed that, in step S1101, the scanned document processing server 131 transmits a request to the business server 141, and in step S1102, the scanned document processing server 131 receives a response indicating that the processing upper limit is reached.

In step S1103, the scanned document processing server 131 performs processing control such as waiting based on the waiting time and the processing time acquired by analyzing the response.

In step S1104, upon detecting a login from the user, the MFP terminal 121 requests the current processing status from the scanned document processing server 131.

In step S1105, the back-end application 351 of the scanned document processing server 131 receives the request. The back-end application 351 responds to the MFP terminal 121 with information about the job currently waiting for processing, or the processing status from the waiting time and the processing time acquired from the response in step S1102.

In step S1106, the external system communication unit 325 of the MFP terminal 121 analyzes the response and presents the notification of the processing status as illustrated in the examples in FIGS. 10A and 10B on the UI 322 to the user.

The above-described processing flow may be performed by a method that is continued at regular time intervals until the processing is completed. Specifically, the MFP terminal 121 may poll the processing flow in steps S1104 and S1105 from the processing status request to returning the response at the regular time intervals. A method may also be used in which the scanned document processing server 131 receives the processing status request, then checks the processing status and returns the response in step S1105 at the regular time intervals.

According to the above-described processing, the processing status of the scan processing server 131 is checked from the MFP terminal 121 and is notified to the user during the operation, so that the user can grasp the current processing status and reduce useless checking work and waiting time.

In the form in which a document scanned by the MFP terminal 121 is provided to the document management system for the business form processing, a business form image that is a result of the business form processing, an applied result, and the setting may be presented to the user on the UI, and the scanned document may be provided to the other business server 141 after the user confirms and edits it.

In a case where an operation takes a longer time than usual, a notification is transmitted to the client application 311 on which the user performs confirmation and editing, thereby reducing useless checking work and waiting time.

In a case where a plurality of notification units such as the above-described notification and e-mail are used together on the client application 311, if the user performs confirmation on an confirmation and editing UI on the client application 311, the notification using an e-mail or the like is unnecessary in some cases. A flow in this case is also supplemented.

Figure 12A:
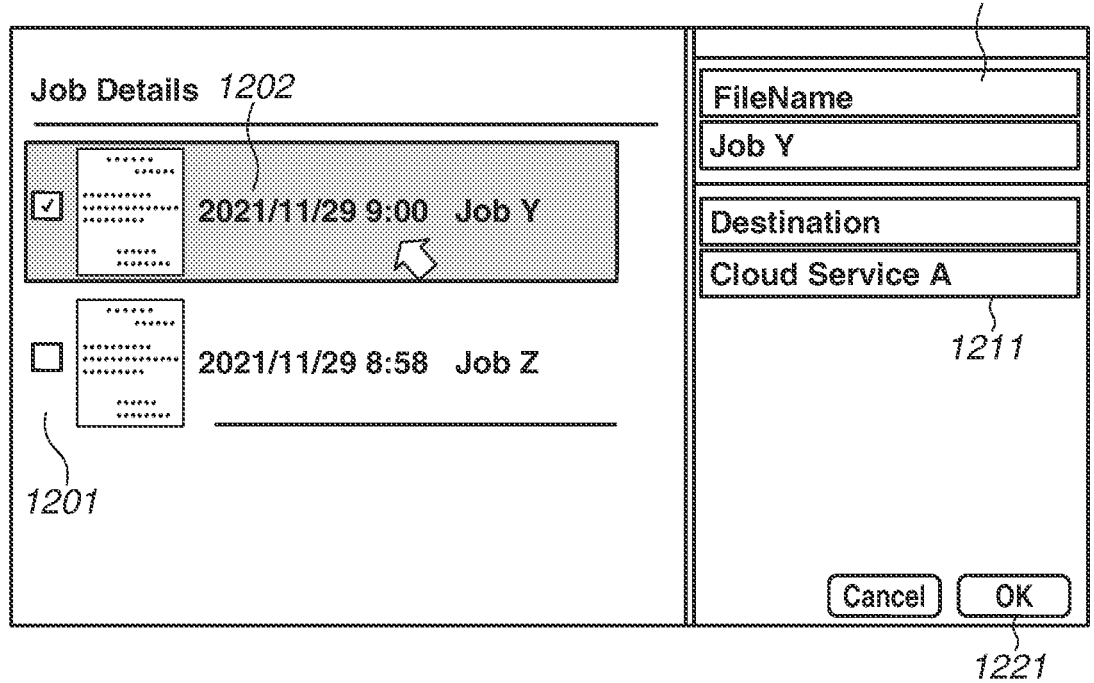
FIGS. 12A and 12B illustrate notification UIs to be displayed by a client application.
Figure 12B:
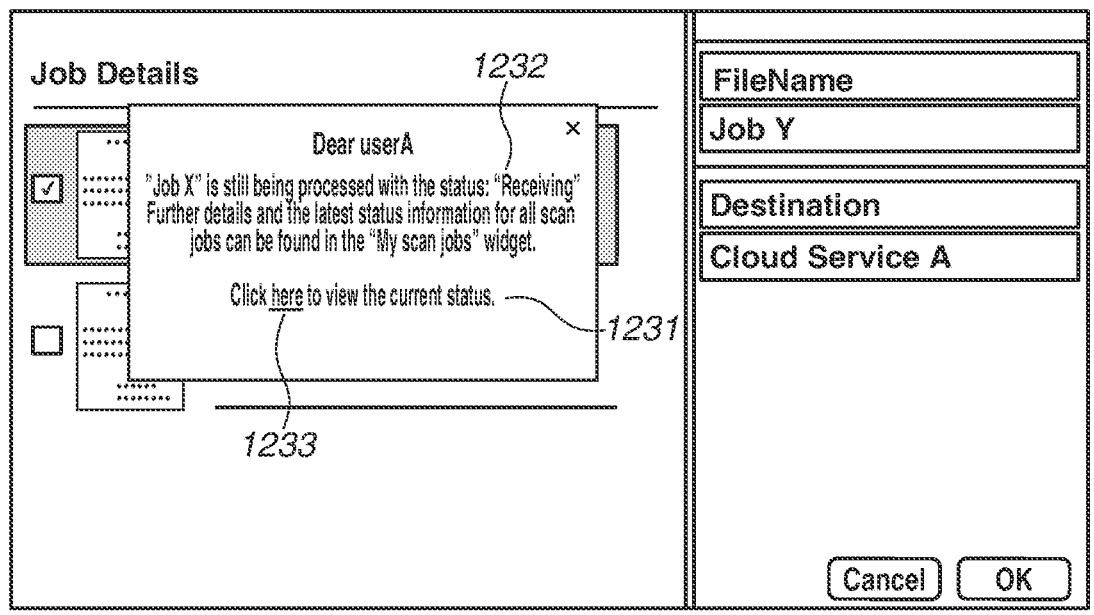

FIGS. 12A and 12B illustrate examples of UIs for confirmation and editing provided by the client application 311. The UI may be in an arbitrary form as long as the UI is used by the user to confirm and edit a processed job. FIG. 12A illustrates a confirmation and editing screen during a user operation. FIG. 12B illustrates the screen in a case where there is a notification during the operation on the UI in FIG. 12A. The UIs illustrated in FIGS. 12A and 12B are displayed on the client application 311 and are provided on pages different from the status display UIs illustrated in FIGS. 5A, 5B-1, and 5B-2.

Main components of the UI are a job display pane 1201 for displaying a list of jobs for which scanning and business form processing are completed and a setting pane 1211 for displaying and editing the setting of the selected job.

A job 1202 is one of the jobs displayed in the job display pane 1201. It is assumed that the job is displayed in a list of jobs associated with the user having logged into the client application 311. The job 1202 is indicated in a state selected by the user. The selected state can be indicated by any means, such as changing a check box or background color, as long as it indicates that the job is selected according to a user's operation.

The displayed job 1202 presents job-related information such as a thumbnail of a scanned document image, registration date and time, and a job name to the user. In a case where there is any other setting information necessary for the user, it can be added and deleted in an arbitrary format and displayed.

In a case where the job is selected, a list of information associated with the job is displayed in the setting pane 1211 for the job. As a representative setting example, settings of the file name 1212 and the transmission destination are illustrated, but in addition, metadata information, such as date and a folder setting, other than the file name may be arbitrarily added.

A button 1221 is used by the user to indicate that he/she completes conformation and editing of the selected job, and in a case where the user selects the button 1221, the job is stored in the corresponding transmission destination.

A notification message 1231 is displayed to the user and includes the notification illustrated in FIGS. 5A, 5B-1, and 5B-2 and FIG. 10B.

In addition, for the sake of the description as below, a button 1232 is used to close the notification message 1231. Arbitrary means, such as closing the notification message 1231 when the notification message 1231 itself is selected, may be used even if the button 1232 is not provided.

A text display 1233 in a link form is used to switch a page to the page in which the status illustrated in FIG. 5A is displayed, and in a case where the text display 1233 is selected, the client application 311 switches the display to the processing status display UI illustrated in FIGS. 5A, 5B-1, and 5B-2.

A processing flow up to issuing a notification to the client application 311 is to be described with reference to FIG. 13.

In step S1301, the status monitoring unit 353 determines whether the predefined period of time passes using the start of registration or status update of each job as trigger.

In a case where the status monitoring unit 353 detects that the predefined period of time passes without the job status being updated (YES in step S1301), in step S1302, the status monitoring unit 353 acquires the detailed information such as the status and the job name of the corresponding job from the job information management unit 345.

In step S1303, the status monitoring unit 353 acquires the information about the notification destination such as the e-mail address from the account information about the user registered in the setting information management unit 344 based on the operating user information defined in the job information management unit 345.

In step S1304, the scanned document processing application 331 uses an approved API provided by the API 332 and confirms whether the user is connected to the scanned document processing application 331 from the user information set in the client application 311. In a case where the connection does not exist (NO in step S1304), in step S1307, the notification is issued to the client terminal 111 by e-mail notification in the same manner as described in FIG. 8.

In a case where it is detected that the user has logged into the client application 311 (YES in step S1304), in step S1305, the notification message illustrated in FIG. 12A is displayed on the client application 311. In a case where the notification message is displayed, processing of a different notification unit, such as an e-mail, is suspended.

In step S1306, the client application 311 detects whether the user performs an operation to confirm the notification transmitted to the user. As an example, the client application 311 detects that the user presses the button 1232 to close the notification or presses the text display 1233 to switch the screen to the processing status display UI illustrated in FIGS. 5A, 5B-1, and 5B-2.

In a case where the operation is detected (YES in step S1306), the client application 311 determines that it is not necessary to transmit the notification by the different notification unit such as an e-mail to the user, stops the processing of the scanned document processing server 131 for issuing an e-mail notification to the user, and terminates the processing without issuing the e-mail notification.

In a case where the operation is not detected (NO in step S1306), in step S1307, the client application 311 determines that the user has just started the client application 311 and does not confirm the notification yet, and issues a notification using means such as an e-mail.

As described above, according to the present exemplary embodiment, an operating user is notified of a processing status of a job and thus can grasp the processing status and reduce useless checking work and waiting time.

The document processing system according to the present disclosure also includes apparatuses, systems, and methods configured by appropriately combining the above-described exemplary embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-066655, filed Apr. 14, 2022, which is hereby incorporated by reference herein in its entirety.

What is claimed is:

1. A document processing system configured to communicate with a server, the document processing system comprising:
    at least one memory that stores instructions; and
    at least one processor that executes the instructions to:
    receive a scanned document from an image processing apparatus;
    transmit the received scanned document and a processing request for processing the scanned document to the server;
    manage a processing status regarding processing of the scanned document; and
    issue a notification to a user in a case where it is determined based on the managed processing status that a predetermined processing time passes without the processing status of the scanned document being updated after a start of the processing of the scanned document even if the user does not request a display of the processing status of the scanned document and no error occurs in the processing of the scanned document.

2. The document processing system according to claim 1, wherein the notification to the user is issued based on a load status of the server and the managed processing status.

3. The document processing system according to claim 1, wherein the notification to the user is issued by providing a screen for displaying information indicating the processing status to the user in a case where it is determined based on the managed processing status that the predetermined processing time passes without the processing status of the scanned document being updated.

4. The document processing system according to claim 1, wherein the notification to the user is issued using an e-mail.

5. The document processing system according to claim 1, wherein the managed processing status is at least any one of receiving the scanned document, processing the scanned document, and transmitting the scanned document.

6. A method for controlling a document processing system configured to communicate with a server, the method comprising:
    receiving a scanned document from an image processing apparatus;
    transmitting the received scanned document and a processing request for processing the scanned document to the server;
    managing a processing status regarding processing of the scanned document; and
    issuing a notification to a user in a case where it is determined based on the managed processing status that a predetermined processing time passes without the processing status of the scanned document being updated after a start of the processing of the scanned document even if the user does not request a display of the processing status of the scanned document and no error occurs in the processing of the scanned document.

7. The method according to claim 6, wherein the notification to the user is issued based on a load status of the server and the managed processing status.

8. The method according to claim 6, wherein the notification to the user is issued by providing a screen for displaying information indicating the processing status to the user in a case where the predetermined processing time passes without the processing status of the scanned document being updated.

9. The method according to claim 6, wherein the notification to the user is issued using an e-mail.

10. The method according to claim 6, wherein the managed processing status is at least any one of receiving the scanned document, processing the scanned document, and transmitting the scanned document.

* * * * *